United States Patent [19]
Zimmerman

[11] 4,338,153
[45] Jul. 6, 1982

[54] WELDING PLASTIC TUBE LINING

[75] Inventor: Heinz A. R. Zimmerman, Bochum-Stiepel, Fed. Rep. of Germany

[73] Assignee: Ameron, Inc., Monterey Park, Calif.

[21] Appl. No.: 243,944

[22] PCT Filed: Jun. 20, 1980

[86] PCT No.: PCT/US80/00767
§ 371 Date: Feb. 23, 1981
§ 102(e) Date: Feb. 23, 1981

[87] PCT Pub. No.: WO81/00006
PCT Pub. Date: Jan. 8, 1981

[30] Foreign Application Priority Data

Jun. 23, 1979 [DE] Fed. Rep. of Germany ....... 2925417
May 14, 1980 [DE] Fed. Rep. of Germany ....... 3018379

[51] Int. Cl.³ .............................................. B65H 8/00
[52] U.S. Cl. .................................... 156/391; 156/215; 156/304.2; 156/304.3; 156/503
[58] Field of Search ............. 156/304.2, 3404.3, 304.4, 156/187, 391–392, 158, 502, 503; 118/105, 254, 218; 156/215

[56] References Cited

U.S. PATENT DOCUMENTS

| | | | |
|---|---|---|---|
| 1,988,329 | 1/1935 | Pevkins | 118/105 X |
| 2,133,013 | 10/1938 | Boylan et al. | 118/105 |
| 2,140,298 | 12/1938 | Miller | 118/105 |
| 2,894,539 | 7/1959 | Cook et al. | 118/215 X |
| 2,960,425 | 11/1960 | Sherman | 118/105 X |
| 3,516,242 | 7/1950 | Munger | 156/391 X |
| 3,810,441 | 5/1974 | Padgett et al. | 118/105 |
| 4,054,473 | 10/1977 | Ohnstad | 156/304.2 X |
| 4,146,419 | 3/1979 | Neidhant | 116/391 |

*Primary Examiner*—David A. Simmons
*Attorney, Agent, or Firm*—Christie, Parker & Hale

[57] ABSTRACT

Welding apparatus for plastic lining (5) in concrete tubing (4) comprises a centering carriage (6) movable inside the tubing along its length and fixable in position at a location adjacent a butt joint (51) having a seam to be welded. A carrier arm (10) is mounted for rotation about an axis (9) coincident with the axis of the tubing (4) for supporting a welding unit (14) at its outer end remote from the axis of the tubing. A drive source (15, 16) adjacent the welding unit engages the interior of the tubing and self propels the welding unit (14) and carrier arm (10) around the interior of the tubing (4). The welding unit (14) is biased outwardly towards the wall of the tubing and is guided along the welding seam by either a guide ring (21) or a roller (20) engaging a gap (48) between adjacent tubing sections. Several degrees of freedom are provided for accommodating lack of concentricity and translation of the welding unit along the length of the tubing without moving the centering carriage.

46 Claims, 13 Drawing Figures

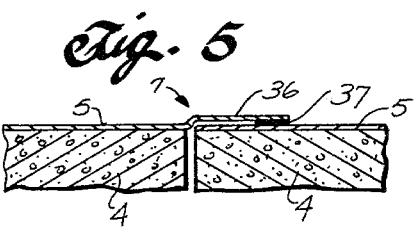
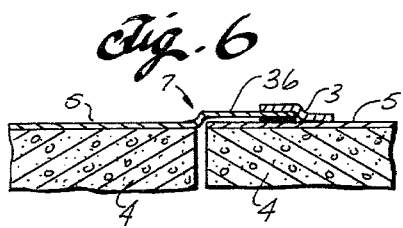
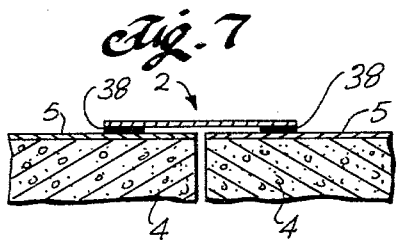
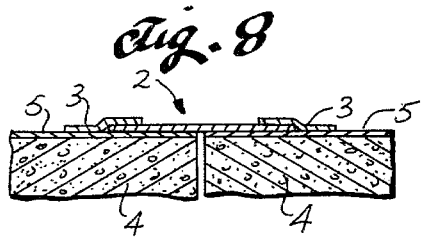
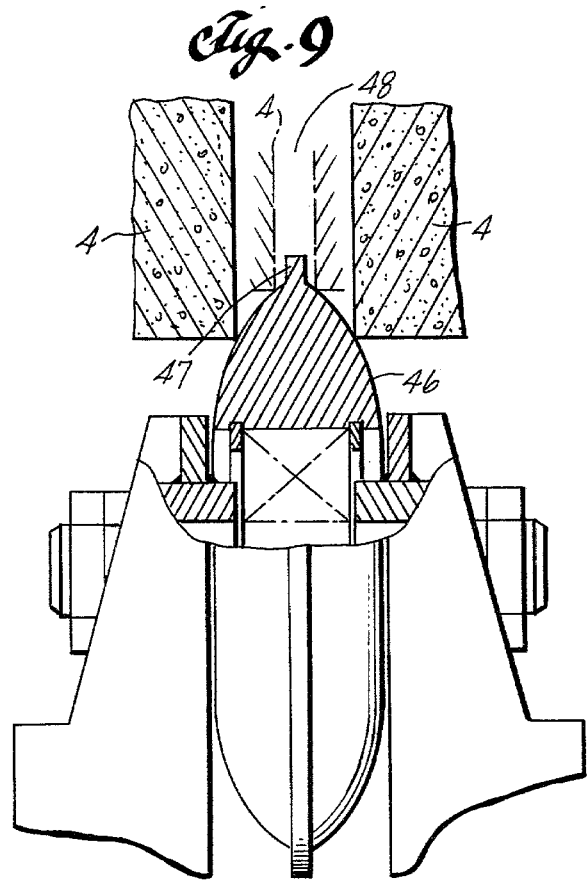

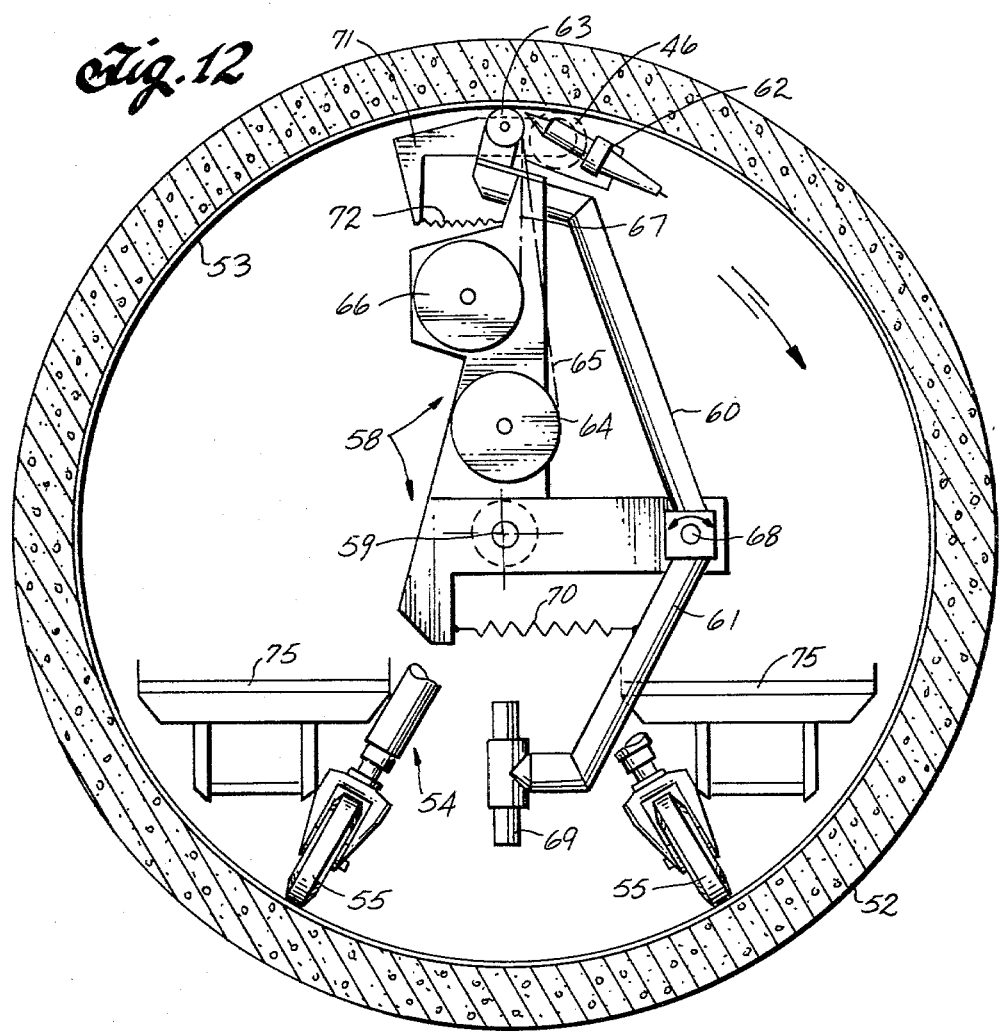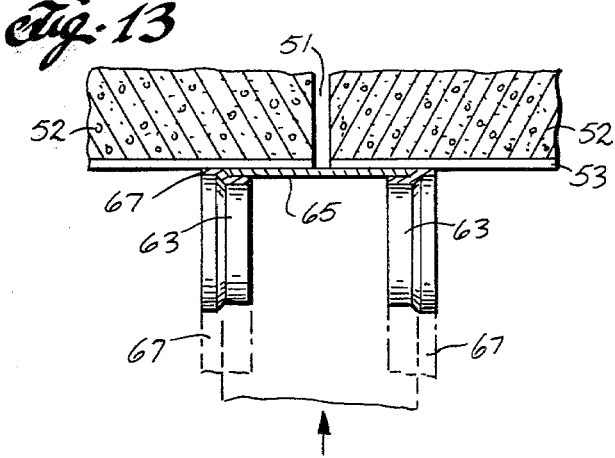

WELDING PLASTIC TUBE LINING

FIELD OF THE INVENTION

This invention concerns welding of the plastic lining inside concrete tubing at the joint between adjacent sections of tubing.

BACKGROUND

Some types of concrete tubing such as those intended for use as sewer pipe are provided with plastic lining for protecting the concrete from the effects of material in the pipe. In exemplary embodiments the lining is polyvinyl chloride or other thermoplastic material in the order of two to five millimeters thick. Such tubing may be lined around the entire circumference or around an upper portion of the circumference. The latter embodiment is suitable for sewer pipe where a lower portion of the pipe is protected by immersion in liquid contents of the pipe and only an upper portion is exposed to gases that could damage the concrete.

In either embodiment it is important to seal the plastic lining within adjacent sections of tubing at the butt joint between the sections. In some embodiments a flap of extra plastic is provided at one end of each section of tubing and that flap is lapped over the plastic lining in an adjacent section of pipe and sealed in place. Alternatively, a strip of plastic can be added along the joint overlapping the plastic lining in adjacent sections of tubing. In either embodiment the overlapped portion is preferably heat welded for providing a fluid-tight seal.

It has been the practice to manually weld such plastic linings using a hot air gun or the like for melting the plastic. Such techniques are costly and difficult and can be subject to variable quality. It is therefore desirable to provide a technique for rapidly and reliably welding the joints in plastic lining in concrete tubing or the like. Preferably the technique should be suitable for tubes of a variety of diameters and for either lap joints employing a flap of plastic from one tubing section overlapping the plastic in another section or joints employing an added sealing strip of plastic over the lining in adjacent sections. Preferably the technique is suitable for welding the lining adjacent a butt joint normal to the tubing axis or at a beveled or mitered joint adjacent a change in direction of the tubing.

BRIEF SUMMARY OF THE INVENTION

There is, therefore, provided in practice of this invention an apparatus for welding the plastic lining of tubing comprising a carriage movable inside such tubing along its length. In use the carriage is fixed in position within the tubing at a selected location adjacent a seam to be welded. At least one carrier arm is mounted on the carriage for rotation about an axis coinciding with the axis of the tubing and a welding unit is mounted on an outer end of such a carrier arm remote from the axis of the tubing so as to be near the wall of the tubing. A drive source adjacent the welding unit includes means for engaging the interior of the tubing and self propelling the welding unit and carrier arm around the interior of the tubing. The welding unit and drive are biased outwardly toward the wall of the tubing, and are guided along a welding seam around the tubing, either by a guide wheel in the gap between adjacent pipe ends or by guide rollers engaging a guide ring temporarily clamped in the tubing. Translation of the welding unit along the length of the tubing to remain aligned with the welding seam is accommodated without moving the carriage. Such translation can be accommodated by mounting the welding unit on a pivot arm which can also pivot about an axis extending radially in the tubing. The carrier arm can also be mounted for pivoting about an axis normal to the tube axis so that the welding unit can be guided along a bevel joint.

DRAWINGS

Additional features and advantages of the present invention will be appreciated as the same becomes better understood by reference to the following detailed description when considered in connection with the accompanying drawings wherein:

FIG. 5 illustrates an exemplary overlap joint;

FIG. 6 illustrates an exemplary overlap joint with a welding strip;

FIG. 7 illustrates an exemplary butt joint sealed with a sealing strip;

FIG. 8 illustrates an exemplary butt joint employing a sealing strip with a welding strip at each edge thereof;

FIG. 9 illustrates semi-schematically a detail of a guide roller for guiding the welding unit along a welding seam;

FIG. 12 is a semi-schematic end view of the apparatus of FIG. 10 in a transverse cross section of tubing; and FIG. 13 is a detailed view of pressure rollers of the apparatus of FIG. 10 adjacent a butt joint.

DESCRIPTION

Figure 1:
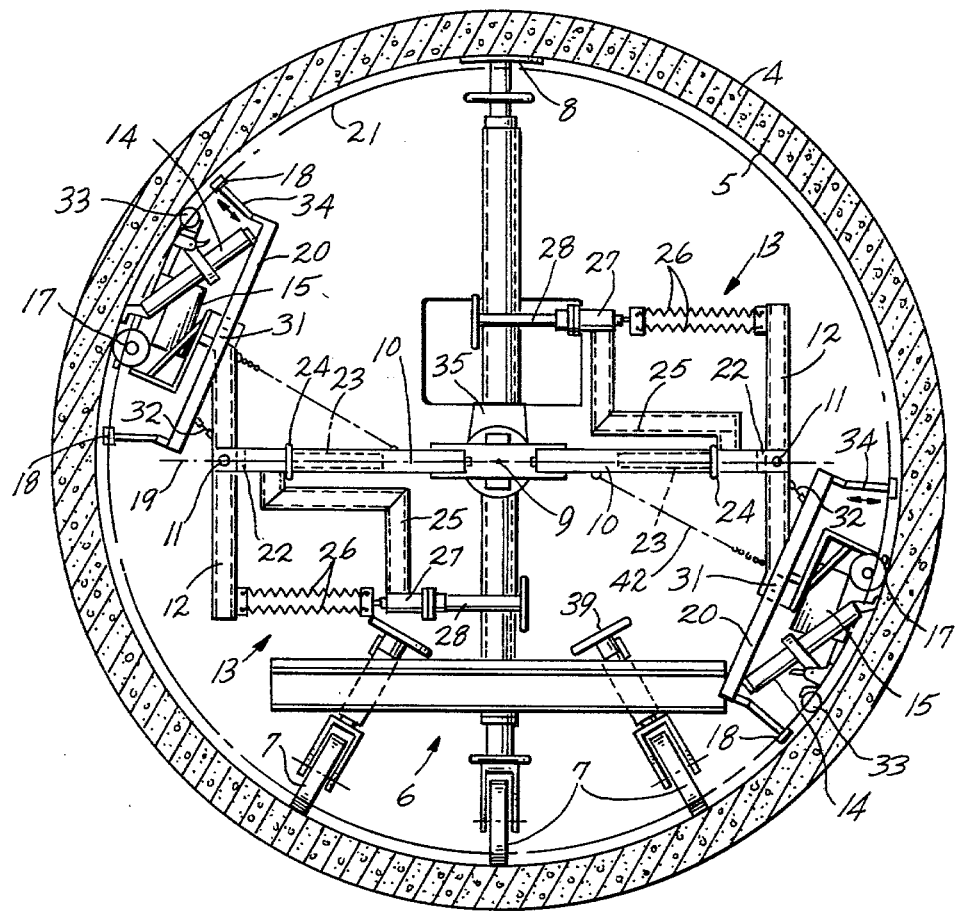
FIG. 1 is a semi-schematic end view of welding apparatus constructed according to principles of this invention within a tube illustrated in transverse cross section.
Figure 2:
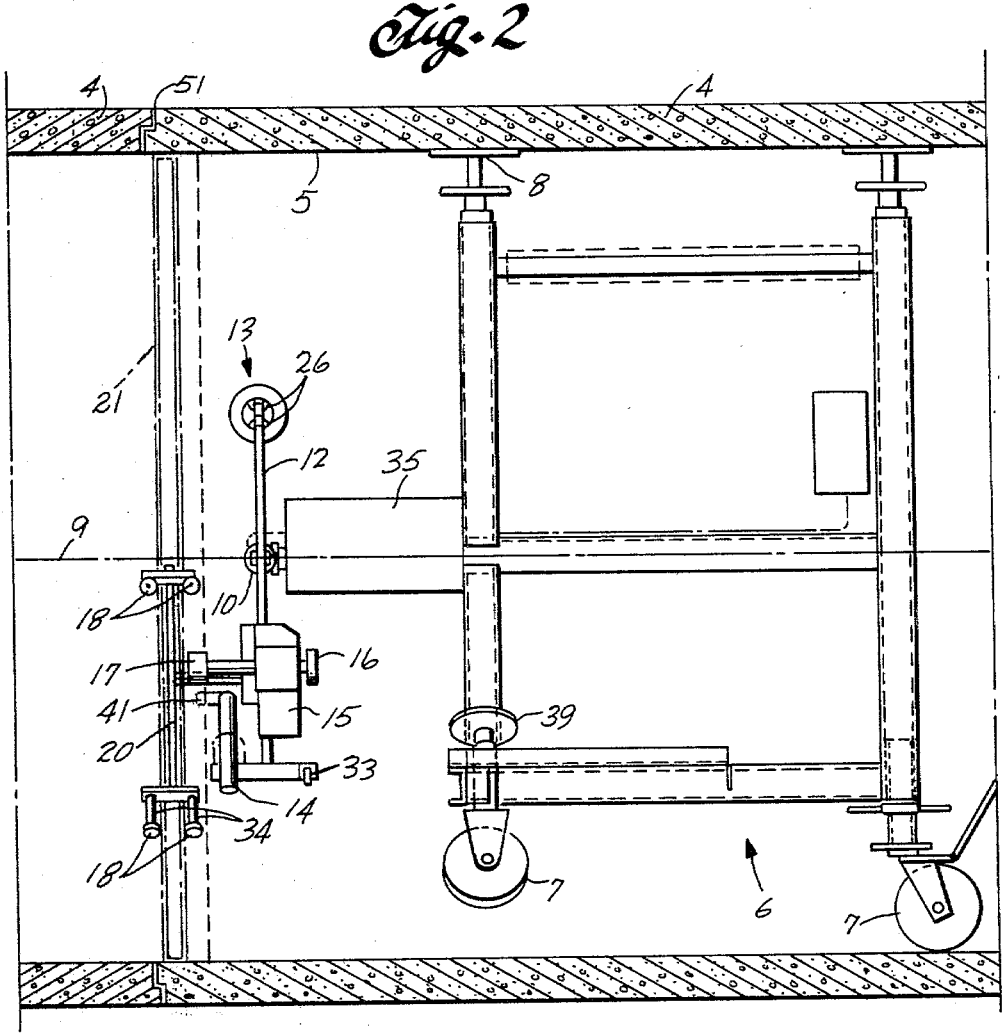
FIG. 2 is a side view of the apparatus of FIG. 1.
Figure 3:
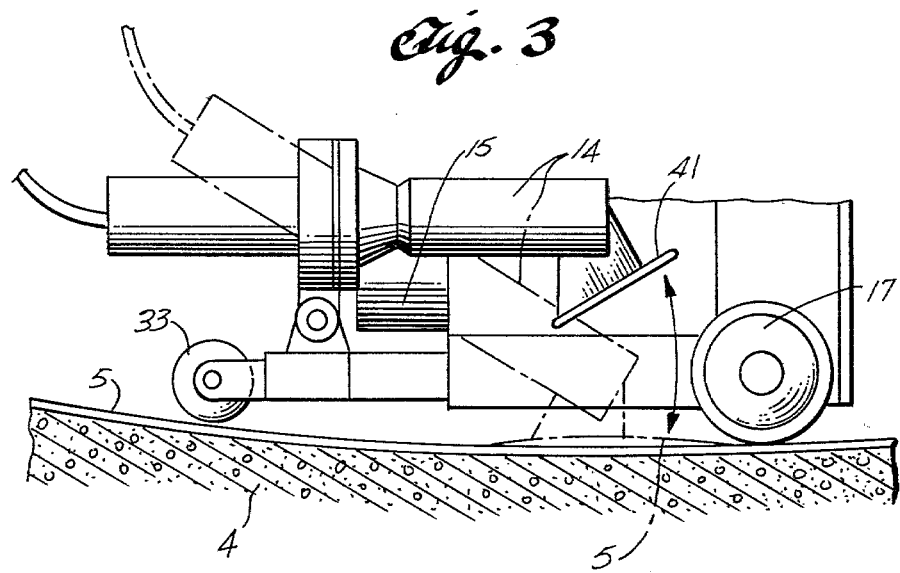
FIG. 3 is a detailed side view of the welding unit and associated guide carriage of the apparatus of FIG. 1.

FIGS. 1 to 3 illustrate an apparatus for welding a joint between abutting tubes 4, particularly concrete tubes having a plastic lining 5. Types of joints that can be welded are illustrated in cross section in FIGS. 5 to 8. Thus, FIG. 5 illustrates an overlap joint 1 where the plastic lining 5 in one of the sections of tubing 4 includes a flap 36 which overlaps the plastic lining in an adjacent section of tubing at a butt joint. A weld 37 is made between the overlapping flap 36 and the plastic lining 5 by heating the plastic to its welding temperature and pressing the two layers of plastic together.

FIG. 6 illustrates an overlap joint wherein a flap 36 is welded to the lining of an adjacent tubing section with use of a welding strip 3 overlapping the edge of the flap and the adjacent tubing lining.

FIG. 7 illustrates a sealing strip joint in which a sealing strip 2 is applied along a butt joint between adjacent tubing sections so as to overlap the tubing lining 5 in each of the tubing sections. The seal strip is welded to the underlying pipe linings at welds 38 along each edge.

FIG. 8 illustrates a butt joint having a sealing strip 2 similar to the joint of FIG. 7 with addition of a welding strip 3 along each edge of the seal strip. Apparatus as provided in practice of this invention can be employed for forming any of these types of joints.

Referring again to FIGS. 1 to 3 the apparatus comprises a centering carriage which is movable within the tubes 4 along their length by means of casters 7. The height of at least a portion of the casters 7 can be adjusted by threaded shafts and hand wheels 39 for accommodating different pipe diameters. An adjustable locating prop 8 can be raised into engagement with the upper wall of the tubing for fixedly positioning the centering carriage in the tubing adjacent a seam to be welded. Such adjustments permit the apparatus to be used in tubing having inside diameters ranging from one to one and one-half meters. A somewhat larger apparatus similar in principle can be adjusted for pipe diameters in the range of one and one-half to three and one-half meters.

A pair of carrier arms 10 are mounted on the centering carriage 6 for rotation about an axis 9 coincident with the axis of the tubing 4. The axis of rotation 9 can be adjusted into coincidence with the tubing axis by the adjustable wheels 7 and prop 8 and once adjusted the apparatus can be used for making repeated welded joints in tubing of the same size.

At the end of each carrier arm 10 a transverse pivot arm 12 is mounted on a fork member 22 so that the pivot arm is free to pivot around an axis 11 which extends more or less parallel to the tube axis 9 (subject to non-alignment due to the degrees of freedom available in the apparatus). A conventional welding unit 14 is mounted on a guide carriage 20 at one end of the pivot arm 12. The welding unit 14 illustrated in the enlarged detail of FIG. 3 comprises a conventional hot air blower fitted with a right angle nozzle 41 which directs heated air underneath a flap or welding strip for heating plastic to its melting point and welding the joint.

The welding unit includes an adjustable speed drive source 15 for at least one drive roller 16 engaging the interior wall of the tubing. Thus, the welding unit is a self-propelled device with the drive source 15 and drive roller 16 acting as the rotary drive source for the carrier arm 10. Such a combined drive and welding unit is commercially available.

A pressure roller 17 on the welding unit compresses the welded joint after the plastic material is heated to its welding temperature. This assures proper compression of the lining material to be welded and continuous welding thereof in the overlapped region. By having the adjustable speed, self-propelled drive source engage the wall surface of the tubing, welds can be made in a broad variety of pipe diameters with limited speed adjustment since surface speed of the welding unit along the welding seam is closely controlled without regard to the angular velocity of the carrier arms 10 around the tube axis 9. Further, the torque required of the drive motor is less than would be needed for a motor driving the carrier arms directly. It is desirable to employ two drive sources 15, i.e, at the outer end of each of the carrier arms for enhanced reliability. Thus, if one drive wheel were to skid on the plastic lining, the other drive wheel can continue to rotate the welding units around the axis 9. Preferably two drives are used even if only one welding unit is active.

A slip ring housing 35 is interposed between the mounting for the carrier arms 10 and the centering carriage 6 for permitting electrical energy to be supplied to the welding unit 14 and drive means 15.

In addition to being pivotable about the axis 11 extending parallel to the tube axis 9 and spaced eccentrically therefrom, the pivot arm 12 is mounted for pivoting about a tube radial axis 19 extending along the length of the carrier arm 10. The fork member 22 has a shaft portion 23 extending inside the hollow carrier arm 10 for a distance limited by a stop collar 24 engaging the end of the tubular carrier arm 10. The shaft is free to rotate within the carrier arm.

An angular mounting bracket 25 on the fork member supports a tensioning device 13 which resiliently biases the welding unit 14 and guide carriage 20 towards the tubing wall. In this embodiment the means for biasing comprises a pair of tension springs 26 connected to the opposite end of the pivot arm 12 from the guide carriage 20. An adjustable spindle 28 connected to the tension springs 26 is in threaded engagement with a spindle nut 27 on the mounting bracket 25. The adjusting spindle 28 permits the operating pressure of the welding unit 14 and hence the pressure roller 17 to be adjusted for assuring a sound weld.

The guide carriage 20 is also connected to the end of the pivot arm 12 for rotation about an axis extending generally radially with respect to the axis of the tubing. In the illustrated embodiment the guide carriage 20 is connected to the pivot arm 12 by a ball and socket joint 31 or its equivalent having at least two degrees of freedom of pivoting. The guide carriage 20 has guide rollers 18 mounted thereon by means of adjustable length legs 34. The guide rollers 18 engage the edges of a guide ring 21 so that the guide carriage and welding unit including the pressure roller 17 accurately follow the seam being welded. The guide ring is removably clamped in position inside the tubing adjacent the welding seam at each joint to be welded. Pilot rollers 33 also maintain the guide carriage in proper position relative to the tubing wall.

Thus, the guide carriage and welding unit have several degrees of freedom so as to accurately and reliably follow a guide ring aligned with a welding seam. The ball joint 31 permits the carriage to skew as guided by the rollers 18 and permits tilting relative to the tubing wall as regulated by the drive roller 16, pressure roller 17 and pilot rollers 33. Rotation of the pivot arm 12 about the generally radial axis 11 accommodates translation of the guide carriage along the length of the tubing as may be needed, for example, in case the centering carriage 6 is out of position along the length of the tubing. Further, pivoting of the pivot arm 12 about the generally axially extending axis 11 in combination with the ball joint mounting of the guide carriage and the biasing device 13 maintains the guide carriage adjacent the tubing wall in case the pivot axis 9 is somewhat out of coincidence with the tubing axis or the tubing is out-of-round. Pivoting of the pivot arms about the radial axis 19 permits the guide carriages to track a somewhat diagonal joint at a mitered corner between adjacent pipe sections. Thus, each possible joint configuration and error in positioning the centering carriage is accommodated by the degrees of freedom provided in mounting the guide carriage.

In using the apparatus for welding a butt joint where adjacent sections of tubing are aligned, the axis of rotation 9 substantially coincides with the common axis of the two sections of tubing. The carrier arms 10 extend essentially radially in such tubing. When the apparatus is employed for welding a beveled or mitered butt joint where the axes of adjacent sections of tubing intersect at an angle, such as, for example 5°, the axis of rotation 9 of the carrier arms is normal to the plane of the joint and the carrier arms rotate essentially in the plane of the joint. For purposes of this specification the axis of rotation 9 is still considered coincident with the axis of the tubing since it is essentially at a mean position between the intersecting axes of the adjacent sections of tubing. Similarly the axis of rotation of the pivot arm is considered to extend radially. It will be recognized that in such an embodiment the welding unit or units travel along an elliptical path within the tubing rather than a circular path as in a straight butt joint. The differences in distance between the tubing axis and the wall are accommodated by the means for biasing the welding unit outwardly on the pivot arm.

In the illustrated embodiment the carrier arms 10 with their associated pivot arms 12, tensioning devices 13, welding units 14, and guide carriages 20 are essentially identical on both sides of the axis of rotation 9, thereby permitting two welded seams to be finished during a single revolution of the apparatus, such as, for example, in a joint using a sealing strip. Such an arrangement also enhances the balance of the rotating portion of the apparatus. When only one seam is being welded, such as in an overlap joint, one of the welding units can be inactive although it is desirable to operate both drive sources 15 for best reliability.

When the apparatus is used, a guide ring 21 is properly aligned and clamped in place within the tubing adjacent a seam to be welded. The centering carriage 6 is advanced to a position substantially as illustrated in FIGS. 1 and 2, and the props 8 are elevated for fixing the centering carriage in the tubing. The guide carriage or carriages 20 are positioned adjacent the tubing wall with the guide rollers 18 engaging the edges of the guide ring 21. The nozzle 41 of the welding unit 14 is placed into the seam to be welded for heating the faying surfaces.

The welding unit and drive source 15 are started so that plastic in the seam is heated to the welding temperature. The guide carriage is advanced by means of the driven drive roller 16 and pressure roller 17. The pressure roller applies pressure to the heated plastic and assures a sound weld as the guide carriage is driven around the interior of the tubing. When the welding seam is completed, the guide carriage and welding head are retracted from the tubing wall and latched by a locking spindle 32 and cable 42. The guide ring can then be unclamped and moved to a new position adjacent the next seam to be welded. Additional degrees of freedom of the apparatus are locked by means of latching arrangements (not shown), the props are retracted, and the centering carriage is rolled to the next seam to be welded.

In many embodiments a lower sector of the pipe is unlined and the weld is commenced and ended adjacent the unlined portion. In an embodiment where the entire tubing circumference is lined, the apparatus is used around almost all of the circumference and the final short sector is welded by hand.

If desired for making a weld having a sealing strip 2 as illustrated in FIGS. 7 and 8 and/or employing a sealing strip 3 as illustrated in FIGS. 6 and 8, rolls of such material can be mounted on the guide carriage 20 for continuous application to the seam being welded. In the case of welding a sealing strip joint both edges of the sealing strip can be simultaneously welded by coupling an additional welding unit adjacent welding unit 14 on one carrier arm at an appropriate lateral spacing corresponding to the width of the sealing strip.

In some embodiments, particularly for a joint employing a sealing strip as illustrated in FIGS. 7 and 8, a guide ring clamped in the plastic lined tubing may not be needed. A guide roller mounted on the guide carriage and fitting into the gap of the butt joint between tubing sections can maintain the welding unit in proper alignment with a seam being welded. Such a guide roller is illustrated in FIG. 9.

In this embodiment the guide roller 46 has an oval or elliptical cross-sectional shape surrounded by a guide flange 47. The guide flange is somewhat narrower than the minimum gap 48 at the butt joint between adjacent tubing sections 4 illustrated in phantom in FIG. 9. When the gap between adjacent sections of tubing is larger than the minimum, the oval or elliptical cross-sectional shape permits the guide roller 46 to penetrate more or less deeply into the butt joint so that proper engagement therewith is assured at all times even if an angular displacement or gaping of the butt joint has to be accommodated. Such a guide roller arrangement can maintain the guide carriage in alignment with a welding seam as effectively as the guide roller 18 engaging a guide ring 21 as illustrated in FIGS. 1 and 2. If desired, the guide roller 46 can have a cross section in the form of double cones with a radial guide flange between the bases of the cones.

Figure 4:
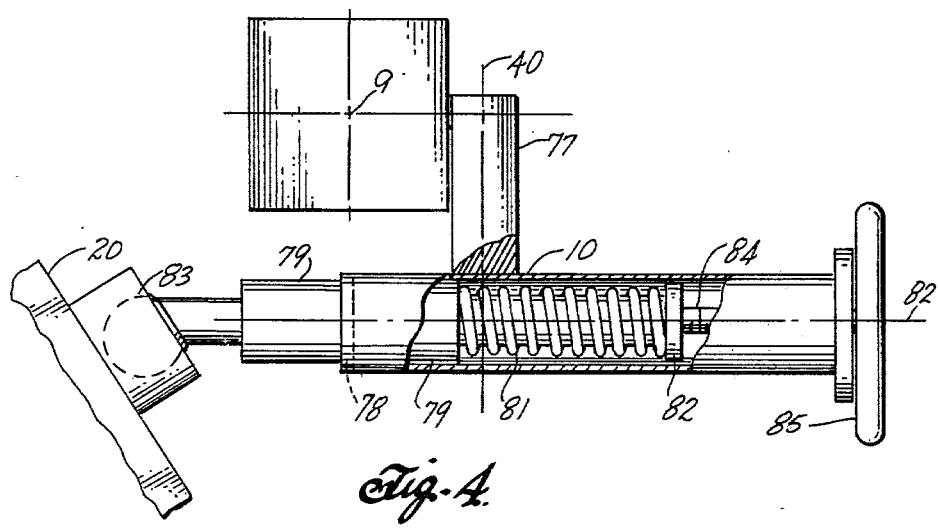
FIG. 4 illustrates an alternative means for mounting the welding unit.
Figure 10:
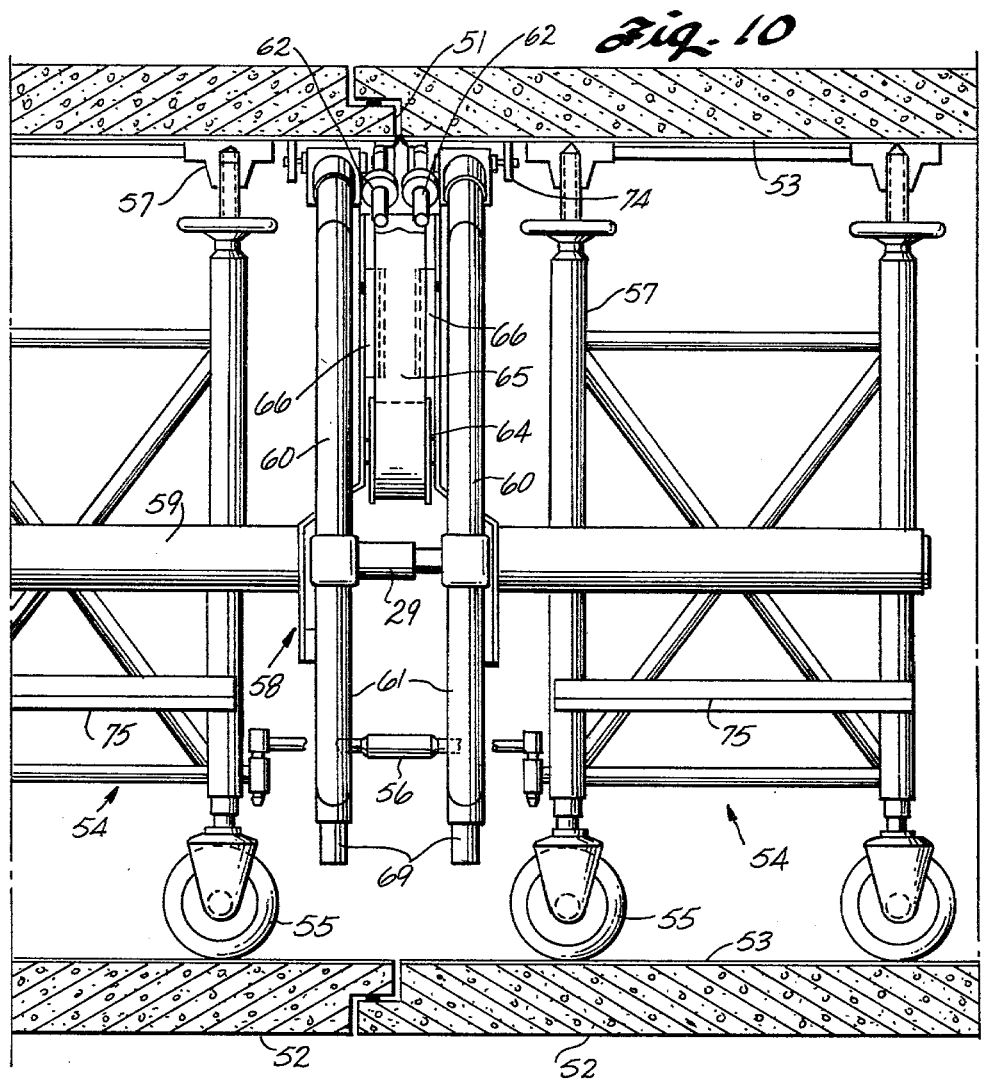
FIG. 10 is a semi-schematic side view of another embodiment of lining welding apparatus in a longitudinal cross section of tubing.
Figure 11:
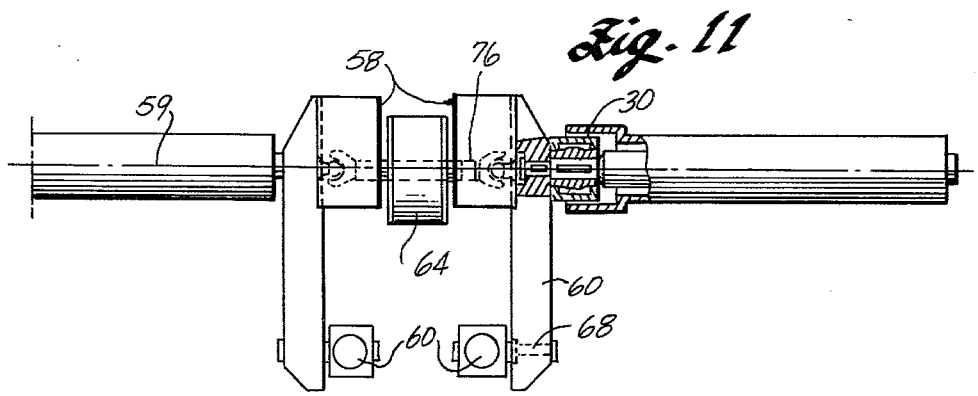
FIG. 11 is a fragmentary detail of mounting for a carrier arm on the apparatus of FIG. 10.

FIG. 4 illustrates in fragmentary detail another mounting for a welding unit on a centering carriage particularly useful for small diameter tubing. In this embodiment the carrier arm 10 is mounted for rotation about the tubing axis 9 as hereinabove described. A pivot 77 is provided near the tubing axis 9 for pivoting the carrier arm 10 about an axis 40 perpendicular to the tubing axis 9. In the illustrated embodiment the pivot axis 40 is offset from the axis of rotation 9, however, if desired these axes can intersect.

The carrier arm 10 is tubular with an internal stop shoulder 78 at its outer end. A hollow shaft 79 has a portion inserted into the tubular carrier arm 10 for translation within the carrier arm. An axial guide tube 80 extends inwardly from the outer end of the shaft inside the tubular carrier arm 10 and a compression spring 81 is positioned around the guide tube 80 between the stop shoulder 78 and a flange 82 on the end of the guide tube. The shaft 79 is free to rotate within the tubular carrier arm 10 thereby providing a degree of rotational freedom about an axis 82 perpendicular to the pivot axis 40. The spring 81 resiliently biases the shaft 79 outwardly towards the wall of the tubing. The flange 82 is internally threaded and engaged by a threaded shaft 84 connected to a hand wheel 85. This permits adjustment of the compression on the spring 81 and hence adjustment of the force applied to a guide carriage 20. The guide carriage 20 for a welding unit (not shown in FIG. 4) is mounted on the outer end of the shaft 79 by a ball and socket joint 83 which provides at least two degrees of rotational freedom perpendicular to the axis 82 of the shaft 79.

The several degrees of freedom permit the welding unit and guide carriage to follow a welding seam. The pivot axis 40 for the carrier arm permits translation of the welding unit along the length of the tubing. The degrees of freedom provided by the ball and socket joint 83 keep the guide carriage parallel to the tubing wall regardless of pivoting around the carrier arm pivot axis 40 or deviations from concentricity of the axis of rotation 9 relative to the axis of tubing. Rotation of the shaft 79 in the tubular carrier arm 10 permits skewing of the guide carriage for following a guide ring. The thrust of the spring 81 resiliently biases the welding unit towards the tubing wall. Such an arrangement can be employed for welding small angle mitered joints by reason of pivoting of the carrier arm around the pivot axis 40.

In the illustrated embodiment the pivot axis 82 is offset from the axis of rotation 9 of the carrier arm. Such is convenient for fitting apparatus in small diameter tubing. In apparatus for larger tubing it is convenient to have the pivot axis 40 for the carrier arms and the pivot axis 82 for the guide carriage both extend radially in the tubing.

FIGS. 10 to 13 illustrate semi-schematically another embodiment of apparatus for welding the plastic lining of concrete tubing or the like. The apparatus illustrated in these drawings straddles a butt joint 51 between adjacent tubes 52, particularly large diameter concrete tubes provided with a plastic lining 53. The apparatus comprises two similar movable centering carriages 54 inside the tubing 52. The centering carriages are mounted on casters 55 bearing against a lower portion of the tubing for moving the carriages along the length of the tubing. The centering carriages can be temporarily coupled to each other by a coupling rod 56 for transport purposes. When the centering carriages are properly positioned in the sections of tubing straddling a butt joint 51 they are fixed in position by adjustable props 57 which clamp against an upper portion of the tubing and temporarily fix the centering carriages in position. A pair of catwalks 75 are provided along the length of the centering carriages in embodiments for large size tubing for providing access by workmen.

A roll carrier 58 is mounted on the centering carriages for rotation about an axis 59 coinciding with the axis of the tubing. Two generally C-shaped carrier arms 60 connected with counterbalance arms 61 are connected to the roll carrier 58 so that they can also rotate about the axis 59 coincident with the axis of the tubes.

The roll carrier 58 and carrier arms 60 are supported on the axis 59 by way of a Cardan shaft 76 to compensate for non-alignment of the two centering carriages and keep rotation of the two carrier arms synchronized. A drag brake 30 is connected to the Cardan shaft for providing a resisting torque so that the carrier arms can be resiliently biased towards the tubing wall.

A welding unit 62 is mounted at the end of each of the carrier arms 60 adjacent the wall of the lined tubing. The welding units 62 on the two carrier arms are spaced apart a predetermined distance for forming two welding seams. A pair of pressure rollers 63 is mounted adjacent the welding unit 62 straddling the butt joint 51 for applying pressure to welded seams.

A sealing strip roll 64 is mounted on the roll carrier for feeding a sealing strip 65 towards the butt joint 51 for overlapping both edges of the butt joint. A pair of welding strip rolls 66 on the roll carrier 58 feed welding strips 67 towards the tubing walls for overlapping opposite edges of the sealing strip 65 and the adjacent pipe lining 53.

The carrier arms are mounted on a portion of the roll carrier 58 for limited pivotal movement about a pivot axis 68 parallel to the rotation axis 59 and eccentrically spaced therefrom, and for limited axial movement along the length of the tubing along the pivot axis 68. An adjustable counterbalance 69 on each counterbalance arm 61 minimizes deflection of the carrier arms as they rotate about the tubing axis 59. The carrier arms 60 are biased for pivoting around the pivot axis 68 towards the wall of the tubing by a tension spring 70 connecting the counterbalance arm 61 with the roll carrier 58. The tension spring biases the pressure rollers 63 towards the wall of the tubing for applying a predetermined force to the plastic in the seams being welded.

A pivot lever 71 is also mounted between the carrier arms 60 and supports a guide roll 46 as illustrated in FIG. 9. The guide roll 46 is maintained in resilient engagement with the butt joint 51 by a tension spring 62 connected between the roll carrier 58 and the pivot lever 71.

The weld units 62 are driven around the inside of the tubing by adjustable speed driving means 73 mounted on each carrier arm. The drive means operate drive wheels 74 which engage the wall of the tubing and drive the welding units in a manner as hereinabove described in the direction indicated by the arrow in FIG. 12.

As the roll carrier and carrier arms rotate about the tubing axis 59, a sealing strip 65 and welding strips 67 are fed from the respective rolls toward the wall of the tubing overlapping the butt joint. Hot air from the welding units 62 is directed onto the faying surfaces of the welding strips and plastic lining of the tubing thereby heating them to their welding temperature. The welding strips are engaged by the pressure rollers 63 which apply sufficient pressure to assure a sound weld. The welding units are guided around the tubing by the guide roller maintained in the gap of the butt joint by the tension spring 72. Pressure is maintained on the pressure rollers by the tension spring 70. Any lack of concentricity of the centering carriages is compensated for by pivoting of the carrier arms about the eccentric pivot axis 68. Variations in position along the length of the tubing are compensated for by longitudinal motion of the carrier arms along the pivot axis 68.

An apparatus as described and illustrated in FIGS. 10 to 13 can also be employed for welding an overlapped joint as illustrated in FIGS. 5 and 6. When operated in this mode only one-half of the welding apparatus shown is required and the sealing strip is deleted. In such an embodiment an auxiliary guide ring is temporarily clamped in proper alignment on the interior wall surface of one of the sections for tubing for positively guiding the welding unit.

What is claimed is:

1. Apparatus for welding plastic lining of tubing comprising:
   a carriage movable along the length of such tubing inside such tubing;
   means for fixing position of the carriage at a selected location in the tubing;
   at least one carrier arm mounted on the carriage for rotation about an axis coinciding with the axis of such tubing;
   a welding unit for welding plastic tubing lining mounted on an outer end of such a carrier arm remote from the axis of rotation;
   drive means for propelling the welding unit and carrier arm around the interior of such tubing;
   means for resiliently biasing the welding unit outwardly towards the wall of the tubing;
   guide means adjacent the welding unit for guiding the welding unit along a welding seam around the tubing; and means for accommodating translation of the welding unit along the length of the tubing in response to the guide means without moving the carriage.

2. Apparatus as recited in claim 1 wherein the means for accommodating translation comprises:
 a pivot arm between the outer end of the carrier arm and the welding unit for mounting the welding unit; and
 means interconnecting the pivot arm and the carrier arm for accommodating rotation of the pivot arm about an axis extending radially in such tubing.

3. Apparatus as recited in claim 2 comprising a connection between the pivot arm and welding unit having at least two degrees of rotational freedom.

4. Apparatus as recited in either of claims 2 or 3 wherein the means for biasing comprises a tension spring connected to the opposite end of the pivot arm from the welding unit and a pivot between the ends of the pivot arm having a pivot axis extending parallel to the axis of rotation.

5. Apparatus as recited in claim 1 comprising means for pivoting the welding unit about an axis transverse to the axis of rotation.

6. Apparatus as recited in claim 1 comprising a pivotal connection between the carrier arm and the welding unit having at least two degrees of rotational freedom.

7. Apparatus as recited in either of claims 5 or 6 wherein the means for biasing comprises a spring directing force outwardly along an axis extending outwardly in such tubing.

8. Apparatus as recited in claim 1 wherein the guide means comprises a plurality of rollers adjacent the welding unit for engaging a ring temporarily mounted in such tubing adjacent a welding seam.

9. Apparatus as recited in claim 1 further comprising means for pivoting the carrier arm about an axis perpendicular to the axis of rotation.

10. Apparatus as recited in claim 8 comprising means for pivotally mounting the welding unit on an outer end of the carrier arm for pivoting about an axis perpendicular to the axis about which the carrier arm can pivot.

11. Apparatus as recited in claim 8 wherein the means for biasing comprises a spring directing force outwardly along the pivot axis for the welding unit.

12. Apparatus as recited in any of claims 9, 10 or 11 comprising a pivotal connection between the carrier arm and the welding unit having two additional degrees of rotational freedom.

13. Apparatus as recited in claim 9 wherein the guide means comprises a plurality of rollers adjacent the welding unit for engaging a guide ring temporarily mounted in such tubing, and further comprising a ball and socket joint between the welding unit and the carrier arm.

14. Apparatus as recited in claim 1 wherein the drive means is mounted adjacent the welding unit and comprises means for engaging an interior wall of the tubing for self-propelling the welding unit and carrier arm around the axis of rotation.

15. Apparatus as recited in claim 1 wherein the mounting for the welding unit on the carrier arm comprises a tube member and a shaft member inserted in the tube member for rotation about an axis extending transverse to the axis of rotation.

16. Apparatus as recited in claim 15 wherein the means for biasing comprises a spring between the tube member and the shaft member for exerting a biasing force outwardly.

17. Apparatus as recited in claim 1 further comprising a pivot arm, means for mounting the pivot arm on the carrier arm for pivotal movement about a pivot axis extending transverse to the axis of rotation of the carrier arm, and means for mounting the welding unit on the pivot arm.

18. Apparatus as recited in claim 17 wherein the welding unit is pivotally mounted on the pivot arm with at least two degrees of rotational freedom transverse to the pivot axis.

19. Apparatus as recited in claim 1 wherein the guide means comprises a plurality of guide rollers for engaging a guide ring temporarily mounted in such tubing.

20. Apparatus as recited in claim 1 wherein the guide means comprises a guide roller for fitting in the gap of a butt joint between adjacent sections of tubing and means for resiliently biasing the guide roller into such gap.

21. Apparatus as recited in claim 20 further comprising means for applying a plastic sealing strip along such a butt joint.

22. Apparatus as recited in claim 1 wherein such carriage comprises a plurality of adjustable wheels on the carriage for engaging an interior wall surface of such tubing at its lower portion and the means for fixing position comprises at least one height adjustable prop for temporary engagement with an interior wall surface of such tubing at its upper portion.

23. Apparatus as recited in claim 1 wherein the carriage comprises at least two carriages interconnected at the axis of rotation and the carrier arm is mounted between such carriages.

24. Apparatus as recited in claim 1 comprising a roll carrier for applying a sealing strip overlapping a welding seam and at least one pressure roller adjacent the welding unit for pressing an edge of the sealing strip against a plastic lining of such tubing.

25. Apparatus as recited in claim 1 comprising means for mounting the carrier arm for pivoting about an axis parallel to the axis of rotation and eccentrically spaced therefrom.

26. Apparatus as recited in claim 25 wherein the means for mounting the carrier arm includes limited movement of the carrier arm along the pivot axis.

27. Apparatus as recited in claim 1 wherein the welding unit comprises a hot air blower for heating plastic lining to its welding temperature and at least one pressure roller for pressing the welding seam.

28. Apparatus for welding plastic lining of tubing comprising:
 at least one carriage movable along the length of such tubing inside such tubing;
 at least one carrier arm mounted on such a carriage for rotation about an axis centrally located in such tubing;
 a welding unit for welding plastic lining of such tubing;
 means for mounting the welding unit on the carrier arm remote from the axis of rotation and pivotable about a pivot axis transverse to the axis of rotation;
 drive means for propelling the welding unit around at least a portion of the circumference of such tubing;
 means for biasing the welding unit outwardly toward the wall of such tubing; and guide means adjacent the welding unit for guiding the welding unit along a welding seam around such tubing.

29. Apparatus as recited in claim 28 comprising a pivotal connection between the welding unit and carrier arm having at least two degrees of rotational freedom transverse to the pivot axis.

30. Apparatus as recited in claim 29 wherein the means for biasing comprises a spring directing force outwardly along the pivot axis.

31. Apparatus as recited in any of claims 28, 29 or 30 comprising means for mounting the carrier arm for pivoting about an axis perpendicular to the axis of rotation.

32. Apparatus for welding plastic lining of tubing comprising:
   at least one carriage movable along the length of such tubing inside such tubing;
   at least one carrier arm mounted on such a carriage for rotation about an axis coinciding with the axis of such tubing;
   means for pivoting the carrier arm about an axis perpendicular to the axis of rotation;
   a welding unit for welding plastic lining of such tubing;
   means for pivotally mounting the welding unit on an outer end of the carrier arm remote from the axis of rotation with at least two degrees of rotational freedom;
   drive means for propelling the welding unit and carrier arm around the interior of such tubing;
   means for biasing the welding unit outwardly toward the wall of such tubing; and
   guide means for guiding the welding unit along a welding seam around such tubing.

33. Apparatus as recited in claim 32 wherein the means for biasing comprises a spring directing force outwardly along an axis extending radially in such tubing.

34. Apparatus as recited in either of claims 32 or 33 comprising in addition means for pivotally mounting the welding unit or an outer end of the carrier arm for pivoting about an axis perpendicular to the axis about which the carrier arm can pivot.

35. Apparatus as recited in either of claims 32 or wherein the guide means comprises a plurality of rollers adjacent the welding unit for engaging a ring temporarily mounted in such tubing adjacent a welding seam.

36. Apparatus as recited in either of claims 32 or 33 wherein the drive means is mounted adjacent the welding unit and comprises means for engaging an interior wall of the tubing for self-propelling the welding unit and carrier arm around the axis of rotation.

37. Apparatus as recited in claim 32 comprising in addition a tube member and a shaft member inserted in the tube member for rotation about an axis transverse to the axis about which the carrier arm can pivot.

38. Apparatus for welding plastic lining of tubing comprising:
   a carriage movable along the length of such tubing inside such tubing;
   at least one carrier arm mounted on the carriage for rotation about an axis centrally located in such tubing;
   a welding unit comprising a hot air blower for heating plastic tubing lining and a pressure roller for pressing a welding seam;
   means for mounting the welding unit on an outer end of such a carrier arm remote from the axis of rotation;
   drive means adjacent the welding unit for engaging an interior wall of such tubing and propelling the welding unit and carrier arm around the interior of such tubing;
   means for resiliently biasing the welding unit and drive means outwardly towards the wall of the tubing; and
   guide means adjacent the welding unit for guiding the welding unit along a welding seam around the tubing.

39. Apparatus as recited in claim 38 wherein the means for mounting the welding unit comprises means interconnecting the welding unit and the carrier arm for accommodating rotation of the welding unit about an axis extending outwardly in such tubing.

40. Apparatus as recited in claim 39 comprising an additional connection between the pivot arm and welding unit having at least two degrees of rotational freedom.

41. Apparatus as recited in either of claims 39 or 40 wherein the means for biasing comprises a spring directing force outwardly along the axis extending outwardly in such tubing.

42. Apparatus as recited in claim 41 wherein the guide means comprises a plurality of rollers adjacent the welding unit for engaging a ring temporarily mounted in such tubing adjacent a welding seam.

43. Apparatus as recited in any of claims 38, 39, or 40 further comprising means for pivoting the carrier arm about an axis perpendicular to the axis of rotation.

44. Apparatus for welding plastic lining of tubing comprising:
   at least one carriage movable along the length of such tubing inside such tubing;
   at least one carrier arm mounted on such a carriage for rotation about an axis centrally located inside such tubing;
   a pivot arm mounted on the carrier arm for pivoting about a pivot axis transverse to the axis of rotation;
   a welding unit for welding plastic lining of tubing mounted on the pivot arm offset from the pivot axis;
   means for biasing the welding unit outwardly toward the wall of such tubing;
   drive means for propelling the welding unit around at least a portion of the circumference of such tubing; and
   guide means for guiding the welding unit along a welding seam around such tubing.

45. Apparatus as recited in claim 44 comprising means for mounting the welding unit on the pivot arm with at least two degrees of freedom of rotation about axes offset from the pivot axis and the axis of rotation.

46. Apparatus as recited in either of claims 44 or 45 comprising means for mounting a center portion of the pivot arm for pivoting about an axis normal to the pivot axis and wherein the means for biasing comprises an adjustable tension spring connected to an end of the pivot arm opposite the end of the pivot arm on which the welding unit is mounted.

* * * * *

UNITED STATES PATENT AND TRADEMARK OFFICE
CERTIFICATE OF CORRECTION

PATENT NO. : 4,338,153

DATED : July 6, 1982

INVENTOR(S) : Heinz A. R. Zimmermann

It is certified that error appears in the above-identified patent and that said Letters Patent is hereby corrected as shown below:

[75] "Zimmerman" should be -- Zimmermann --.

Column 11, line 44, "or" should be -- on --.

Column 11, line 47, -- 33 -- should be inserted after "or".

Signed and Sealed this

Twelfth Day of October 1982

[SEAL]

Attest:

GERALD J. MOSSINGHOFF

Attesting Officer

Commissioner of Patents and Trademarks